United States Patent [19]

Yousef et al.

[11] Patent Number: 5,060,740
[45] Date of Patent: Oct. 29, 1991

[54] SCREW THREAD COUPLING

[75] Inventors: Faisal J. Yousef; Robert F. Kane, both of Houston; Joel Ham, Cypress; David Mildren, Houston, all of Tex.

[73] Assignee: Sandvik Rock Tools, Inc., Bristol, Va.

[21] Appl. No.: 529,377

[22] Filed: May 29, 1990

[51] Int. Cl.[5] .................... E21B 10/36; E21B 17/042; F16B 35/04; F16L 15/06
[52] U.S. Cl. .................... 175/415; 285/334; 285/390; 403/343; 411/414; 411/423
[58] Field of Search ............ 175/415, 414, 416, 417, 175/320; 411/411-416, 423, 311, 392; 403/343, 306, 307; 285/334, 390

[56] References Cited

U.S. PATENT DOCUMENTS

| | | | |
|---|---|---|---|
| 3,258,284 | 6/1966 | Phipps | 403/343 |
| 4,040,756 | 8/1977 | Donegan | 403/307 |
| 4,295,751 | 10/1981 | Holmberg | 411/411 X |
| 4,549,754 | 10/1985 | Saunders et al. | 411/411 X |
| 4,799,844 | 1/1989 | Chuang | 411/414 |
| 4,842,466 | 6/1989 | Wheeler et al. | 411/411 X |
| 4,861,209 | 8/1989 | Larsson | 411/411 |
| 4,861,210 | 8/1989 | Frerejacques | 411/411 |
| 4,907,926 | 3/1990 | Wing | 411/414 X |
| 4,943,095 | 7/1990 | Sugimura | 285/334 |

Primary Examiner—Stephen J. Novosad
Attorney, Agent, or Firm—Burns, Doane, Swecker & Mathis

[57] ABSTRACT

A thread coupling comprises two interconnected screw threads. Each of the screw threads has a root portion shaped as a portion of an ellipse. With respect to one of the threads having such a shape, the major axis of the ellipse is longer than that of the other thread.

20 Claims, 3 Drawing Sheets

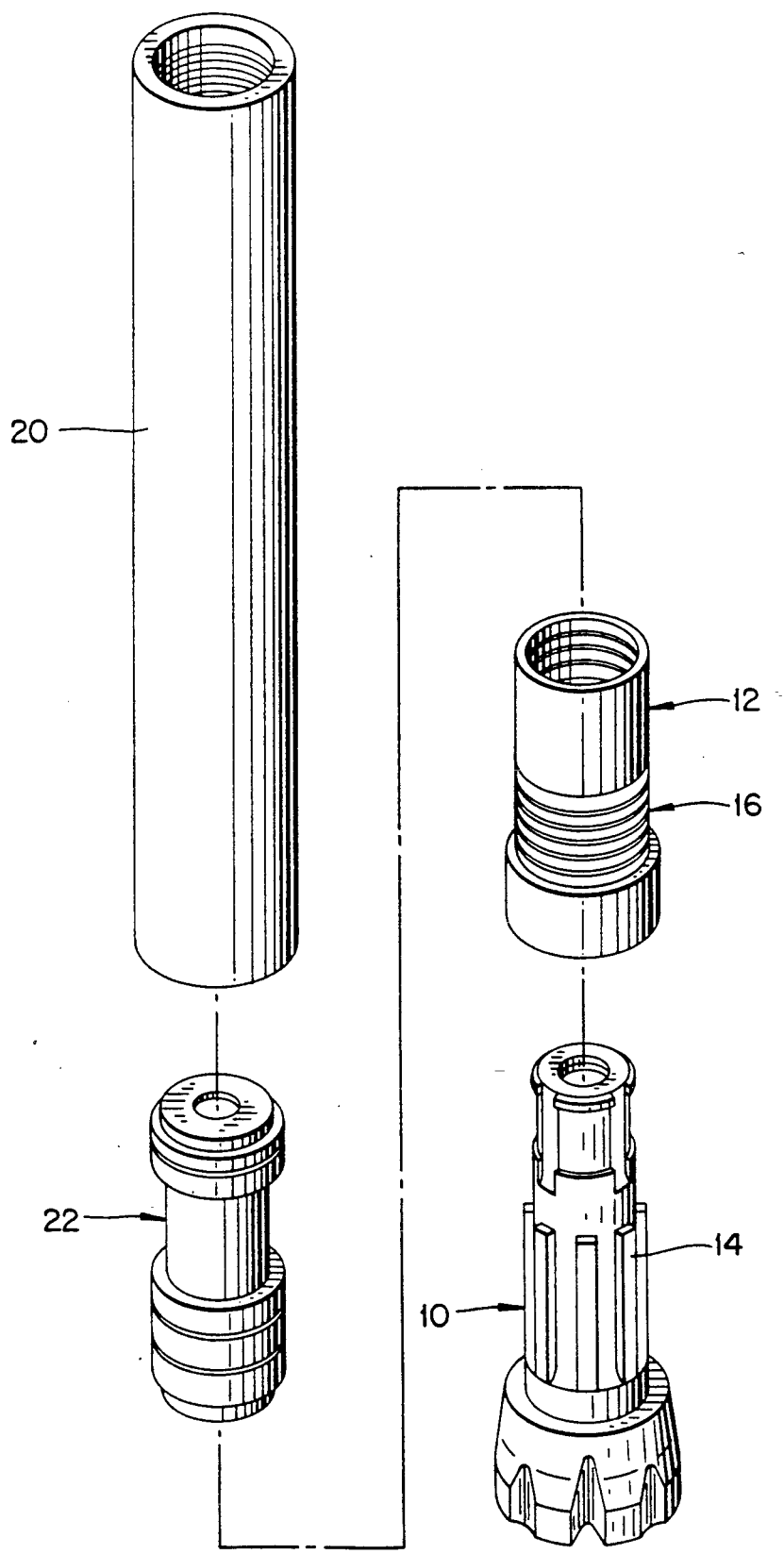

SCREW THREAD COUPLING

BACKGROUND OF THE INVENTION

This invention relates generally to a screw thread coupling and in particular to an improvement of the screw thread coupling disclosed in U.S. Pat. No. 4,799,844.

In the art of percussion drilling, such as for mining, quarrying water well drilling, and the like, various components of a drilling tool are frequently coupled together by threaded screw structures. In these coupled drilling components, the thread design is of considerable importance since failure often occurs in the screw structure. Whenever failure in the screw structure does occur, the crack usually initiates at the thread root. This is due to the high stress concentration located at the root of the thread when the screw structure is subject to severe loading.

Traditionally, the root portion has been configured as a portion of a circle, tangentially adjoining the two flanks of successive thread turns. Generally speaking, the stress concentration along the thread root is an inverse function of the radius of that circle, i.e., the larger the radius of the circle, the lower the stress concentration. However, when the size of the radius surpasses a maximum allowable value, the stress concentrations at the ends of the root, where the flanks of the adjacent thread turns tangentially adjoin the root, become very high and thus provide starting points for crack propagation. Alteratively, when the size of the radius defining the circular root curvature decreases below a minimum allowable value, the stress concentration becomes very high at the bottom of the root. Thus, circular root curvatures are confined to radii sizes falling between certain maximum and minimum limits, depending on such factors as thread pitch and the like.

An improved screw structure has been disclosed in U.S. Pat. No. 4,799,844 wherein the screw structure of each of the threadedly interconnected drilling components includes a root portion configured as a portion of an ellipse. That elliptical root curvature provides a larger equivalent radius at the thread root which results in a decreased stress concentration along the root. Notwithstanding the benefits attainable by that screw structure, room for improvement remains.

In that regard, it may occur that the screw structure is utilized to interconnect two components having different expected life spans, such as certain elements of a percussion drill, for example. Depicted in FIG. 1 is a down hole percussion drill which includes a drill bit 10 mounted at the end of a drill string. The drill string includes a driver sub 12 which slides over a rear end of the drill bit and which is connected to the drill bit 10 by a spline connection, i.e., by eternal splines 14 on the drill bit and internal splines (not shown) on the driver sub 12. The drill bit 10 is thus constrained to rotate with the driver sub 12 but is capable of limited axial movement relative thereto. The driver sub 12 includes an external or male screw thread 16 which is threadedly connected to an internal or female screw thread 18 of a cylindrical case 20. Slidably disposed within the case 20 is a piston 22 which is axially reciprocated by a conventional air-actuated mechanism in order to apply percussive forces to the rear end of the driver sub. Those forces are transmitted through the driver sub to the drill bit to enhance the penetration rate of the drill bit. An upper end of the case 20 is threadedly connected to a top sub (not shown), and the latter is threadedly connected to another element of the drill string, and so on.

The use in such a percussion drill of a screw structure having an elliptical root as disclosed in U.S. Pat. No. 4,799,844 has reduced the occurrence of stress fractures at the thread roots. However, other factors come into play during a drilling operation to wear out and shorten the life span of the drilling elements. That is, the percussive loads transmitted through the drilling components produce wearing of the thread flanks; contact with the surrounding earth and rock formations produces an erosion of the outer surfaces of the drilling elements. Also, the drive splines of the driver sub are susceptible to wear as the result of impacting and rubbing against the splines of the drill bit. In practice, it has been found that those factors affect some of the drilling components more so than others, whereby the various components tend to wear out at different rates and require replacement at different times. For example, the cylindrical case 20 tends to wear out less rapidly than the driver sub 12. Furthermore, the present inventor has observed that the case often tends to require replacement as the result of thread wear, whereas a driver sub normally must be replaced well before its thread has worn out.

It will be appreciated that the replacement of a drilling component is quite expensive in that it requires that the drilling operation be stopped so that the drill string can be raised. An enhancement of productivity and efficiency could thus be realized if the frequency of such work stoppages could be reduced.

SUMMARY OF THE INVENTION

The present invention involves a threaded element and a threaded mating member, preferably comprising components of a percussion drill. The threaded element includes a first screw structure, and the mating member includes a second screw structure. The first screw structure comprises at least one first screw thread extending helically in spaced thread turns. The first thread includes a first load bearing flank, a first non-load bearing flank, and a first crest portion extending between the first load bearing flank and the first non-load bearing flank. The first screw also includes a first root extending between adjacent turns of the first thread. The first root is defined by a portion of a first generally elliptical curvature having a major axis extending parallel to the axial direction. The second screw structure comprises at least one second screw thread extending helically in spaced thread turns. The second thread includes a second load bearing flank adapted to engage the first load bearing flank. A second non-load bearing flank, and a second crest portion extending between the second load bearing flank and the second non-load bearing flank. The second thread also includes a second root extending between adjacent turns of the second thread. The second root is defined by a portion of a second generally elliptical curvature having a major axis extending parallel to the axial direction. The first and second threads are of substantially equal height. The first thread has an axial thickness greater than an axial thickness of the second thread. The major axis of the second root is longer than the major axis of the first root.

BRIEF DESCRIPTION OF THE DRAWING

The objects and advantages of the invention will become apparent from the following detailed description of preferred embodiments thereof in connection with the accompanying drawings in which like numerals designate like elements, and in which:

FIG. 2 is an exploded perspective view of the conventional components forming the front end of the percussion drill;

DETAILED DESCRIPTION OF PREFERRED EMBODIMENTS OF THE INVENTION

Figure 1:
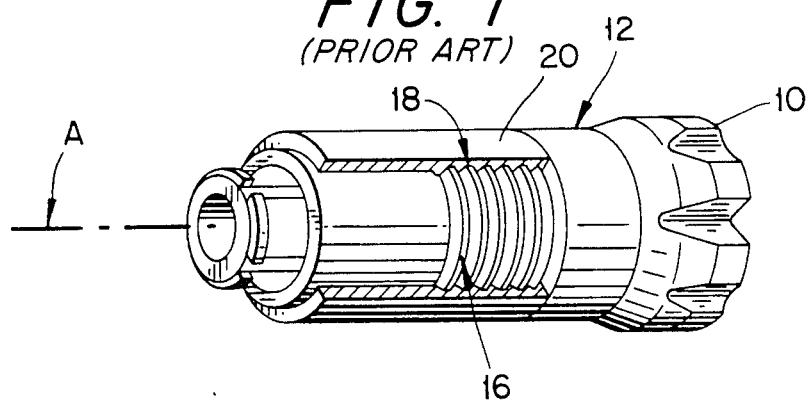
FIG. 1 is a perspective view, partially broken away, of the front end of a conventional down hole percussion drill.

Depicted in FIGS. 1 and 2 is a front portion of a conventional down hole percussion drill which includes a drill bit 10 mounted at the front end of a drill string. The drill string includes a threaded element in the form of a driver sub 12 which slides over a rear end of the drill bit and which is connected to the drill bit 10 by a spline connection, i.e., by external splines 14 on the drill bit and internal splines (not shown) on the driver sub 12. The drill bit 10 is thus constrained to rotate with the driver sub 12 but is capable of limited axial movement relative thereto.

The driver sub 12 includes an external or male screw thread 16 which is threadedly connected to an internal or female screw thread 18 of a mating member in the form of a cylindrical case 20. Slidably disposed within the case 20 is a piston 22 which is axially reciprocated by a conventional mechanism in order to apply percussive forces to the rear end of the drill bit to enhance the penetration rate of the drill bit. An upper end of the case 20 is threadedly connected to a top sub (not shown), and the latter is threadedly connected to another component of the drill string, and so on.

Figure 3:
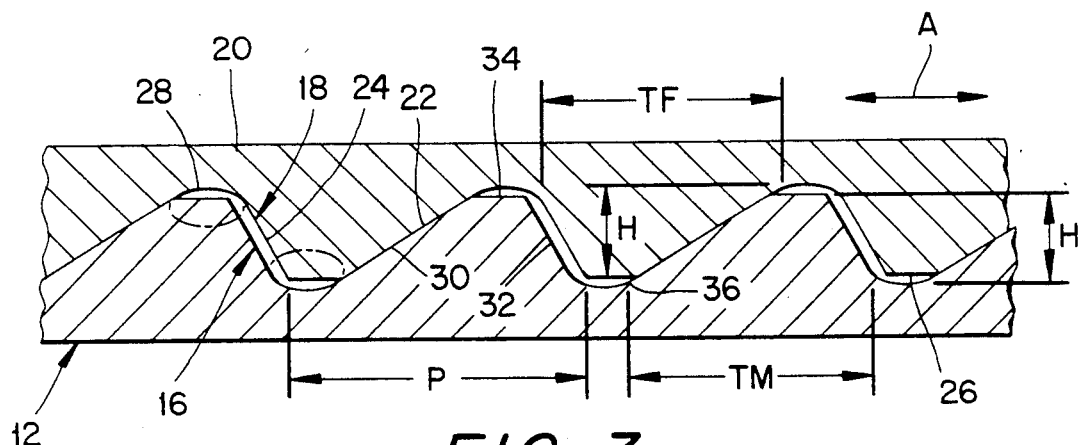
FIG. 3 is a longitudinal sectional view through a portion of a conventional thread coupling.
Figure 4:
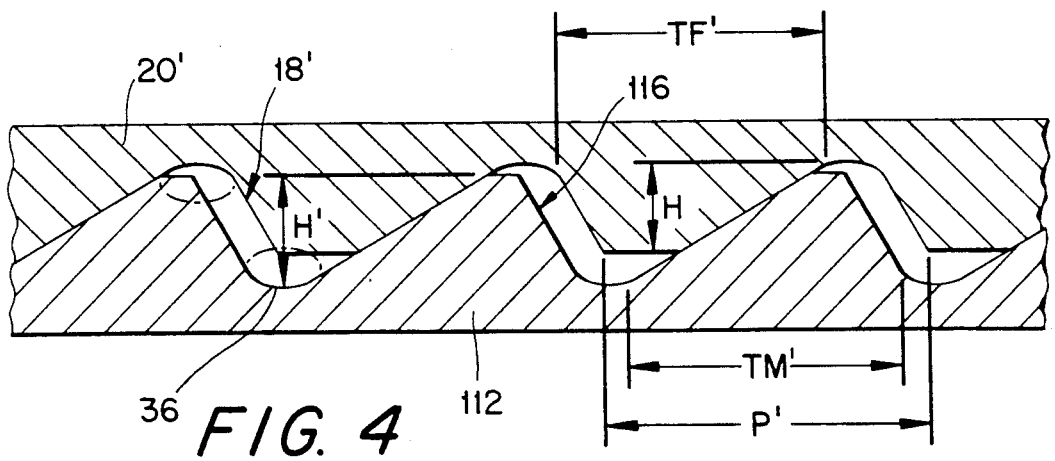
FIG. 4 is a view similar to FIG. 3 of a nonpreferred theoretical thread coupling depicted for a better understanding of the present invention.
Figure 5:
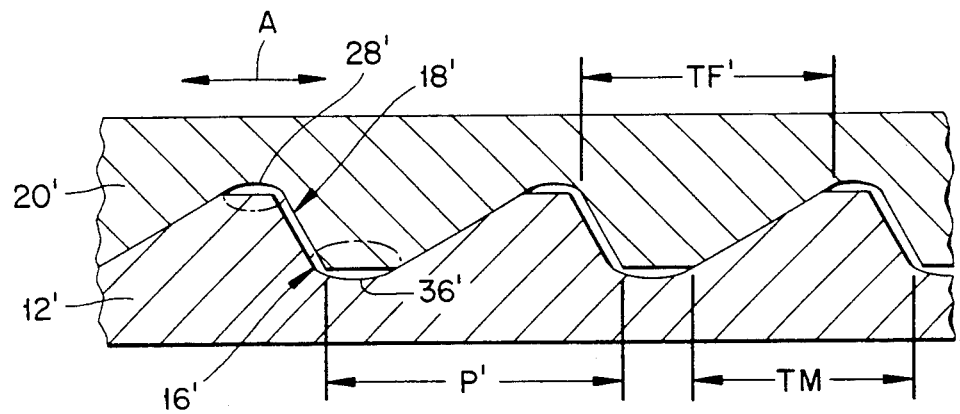
FIG. 5 is a view similar to FIG. 3 of a first embodiment of a thread coupling according to the present invention.
Figure 6:
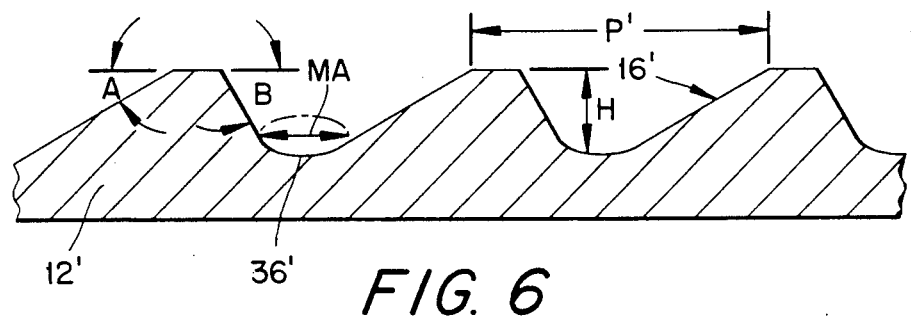
FIG. 6 is a view of one of the thread structures of the coupling depicted in FIG. 5.

A preferred screw structure according to the present invention is depicted in FIG. 5; a modification of that preferred screw structure is depicted in FIG. 6. FIG. 3 depicts a prior art screw structure of which the present invention constitutes an improvement. FIG. 4 depicts a non-preferred, theoretical screw configuration presented solely for the purpose of a better understanding of the present invention.

The prior art screw structure of FIG. 3 and that of the present invention possess certain common features. For example, with reference to FIG. 3, the female screw structure 18 comprises a helical thread which includes a load bearing flank surface 22, a non-load bearing flank surface 24, and a flat crest portion 26 extending between those flank surfaces 22, 24. A root 28 extends between adjacent turns of the female thread.

The male screw structure also comprises a helical thread which includes a load bearing flank surface 30, a non-load bearing flank surface 32, and a flat crest portion 34 extending between those flank surfaces 30, 32. A root 36 extends between adjacent turns of the male thread.

It is preferable to provide the roots 28, 36 of the screw structures 16, 18 with a curvature defined by a portion of an ellipse having a radially extending minor axis and a major axis extending parallel to the axial direction A, in accordance with the teachings of U.S. Pat. No. 4,799,844. The elliptical shapes which define the curvatures of the root portions are depicted in broken lines in FIGS. 3-6. The minor axis of each root is shorter than the radial distance between the root and an adjacent crest of the respective thread.

Because of the extreme loads applied to screw structures in the percussion drilling environment, the load bearing flank of the thread has a greater surface area than the non-load bearing flank. That is, the thread profile resembles a typical reverse buttress thread profile. Alteratively, the thread could be shaped as a buttress thread wherein the non-load bearing flank has a greater surface area than the load bearing flank. A single thread lead is depicted, although any suitable multiple thread lead could be used if desired.

The load bearing and non-load bearing flanks extend tangentially from the ends of the root straight to the respective crest portions. Preferably, the load bearing flank has an angular slope extending away from the crest portion at approximately 30°. Likewise, the non-load bearing flank has an angular slope extending away from the crest portion at approximately 60°.

The elliptical root presents a larger equivalent radius than a circular root and thus provides a greater relief in stress concentration at the root. Also, the elliptical root is stronger than a circular root structure because of the greater wall thickness which remains after the elliptical root is formed. Furthermore, the elliptical root configuration allows for greater thread-to-thread contact between abutting load bearing flanks. These advantages are explained in greater detail in U.S. Pat. No. 4,799,844, the disclosure of which is incorporated by reference herein.

The axial thicknesses of the prior art male and female threads are designated by reference letters TM and TF, respectively, and are equal to one another. The prior art male and female threads have substantially identical heights and pitches designated by the reference letters H and P, respectively.

As noted earlier, the prior art driver sub has heretofore tended to wear out and require replacement before its screw structure 16 has worn out. Thereafter, the case 20 would require replacement, usually due to the wearing-out of the thread flanks of its screw structure 18.

In accordance with the present invention, a thread coupling is provided for the drilling elements which prolongs the average life span of the case 20 without appreciably diminishing the average life span of the driver sub. Consequently, the case will last longer and the frequency of work stoppages for replacement of the case will be reduced, whereby productivity will increase and overall costs will be reduced. As will be explained, this advantage is accomplished in a manner which results in an increased axial thickness of the thread of the case without requiring a reduced axial thickness or increased height of the thread of the driver sub. Furthermore, the advantages of an elliptically configured thread root are retained.

To achieve those results in accordance with the present invention, the axial thickness of the female thread 18′ is enlarged from thickness TF (FIG. 3) to a larger thickness TF′(FIG. 5). In order to maintain the same elliptical root configuration of the female thread root, the pitch of the female thread 18' has been enlarged from P to P'. The pitch of the male thread 16' is, of course, correspondingly increased to P'.

Before proceeding further with a description of the improved thread coupling according to the present invention, a non-preferred, theoretical thread coupling depicted in FIG. 4 will be briefly touched upon. That non-preferred thread coupling of FIG. 4 includes the above-described modified female thread 18' in which the axial thickness and pitch have been increased. A theoretical version of the male thread 116 of the driver sub 112 is depicted in FIG. 4 to show how that male thread could be modified in order to conform to the modified female thread while maintaining the same basic elliptical shape of the root. That modification of the male thread would involve a reduced axial thickness TM' and an increased height H'. However, the resulting thin, narrow thread structure 116 of the male thread would be weaker and more susceptible to breakage. Thus, the male thread configuration of FIG. 4 is not preferred.

Instead, a preferred embodiment of the invention depicted in FIG. 5, is characterized by the aforementioned female thread 18' of increased thickness TF' and pitch P', and a male thread 16' (depicted in FIGS. 5 and 6) whose root 36' has the shape of a portion of an ellipse in which at least the major axis MA has been increased in length as compared to that of FIG. 3. As a result, there is no need to increase the height H of the male thread or to reduce its thickness TM in a manner which would produce an excessive weakening thereof.

In sum, a thread coupling according to the present invention involves two threads 16', 18' (depicted in FIG. 5), each thread having a load bearing flank surface, a non-load bearing flank surface, and a crest portion extending between those flank surfaces. A root of generally elliptical curvature extends between adjacent turns of the thread, with the major axis of the ellipse extending parallel to the axial direction A. A first of the threads 18' has an axial thickness TF' greater than the axial thickness TM of the second thread 16'. The major axis MA of the root portion 36' of the second thread 16' is longer than that of the first thread 18'. The first and second threads 16' and 18' are preferably of substantially the same height H. Each minor axis is shorter than a radial distance between the root and crest of the respective screw structure.

Because of its increased axial thickness, the first thread 18' will last longer, thereby lengthening the expected life span of the case 20. This advantage is achieved without altering the life span of the driver sub 12'. That is, even though the thread 16' of the driver sub 12' is of reduced thickness and thus less wear-resistant, the frequency of replacement of the driver sub will not increase, because the life span of the drive sub 12' is usually determined by other factors as noted earlier.

Figure 7:
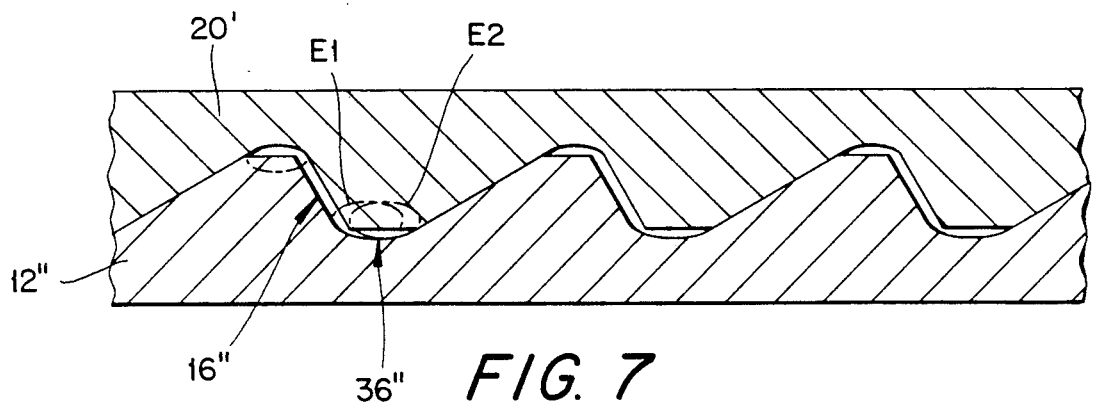
FIG. 7 is a view similar to FIG. 3 of a second embodiment of the present invention.

It will be appreciated that the elliptical curvatures of the root portions according to the present invention need not be defined by precisely elliptical shapes. For example, in a modification depicted in FIG. 7 the root 36" of the male thread 12" has a curvature defined by a generally elliptical shape formed by two axially overlapping ellipses E1, E2. That generally elliptical shape is longer than the elliptical shape of the female thread root so as to achieve the benefits explained in connection with FIGS. 5, 6.

As noted earlier, the load bearing flank surface has an angular slope A (FIG. 6) of about 30°, and the non-load bearing flank surface has an annular slope B of about 60 degrees, although other suitable angles could be used.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. In combination, a threaded element and a threaded mating member adapted to be coaxially threadedly interconnected, said element and said member including first and second screw structures, respectively: said first screw structure comprising:
   at least one first screw thread extending
      helically in spaced thread turns, said first thread including a first load bearing flank, a first non-load bearing flank, and a first crest portion extending between said first load bearing flank and said first non-load bearing flank, and
   a first root extending between adjacent turns of said first thread, said first root defined by a portion of a first generally elliptical curvature having a major axis extending parallel to the axial direction,
said second screw structure comprising:
   at least one second screw thread extending helically in spaced thread turns, said second thread including a second load bearing flank adapted to engage said first load bearing flank, a second non-load bearing flank, and a second crest portion extending between said second load bearing flank and said second nonload bearing flank, and
   a second root extending between adjacent turns of said second thread, said second root defined by a portion of a second generally elliptical curvature having a major axis extending parallel to the axial direction,
said first thread having an axial thickness greater than an axial thickness of said second thread,
said major axis of said second root being longer than said major axis of said first root.

2. A combination according to claim 1, wherein said second generally elliptical curvature is defined by two axially overlapping ellipses.

3. A combination according to claim 1, wherein each of said first and second generally elliptical curvatures is defined by a single ellipse.

4. A combination according to claim 1, wherein said first thread constitutes a female thread and said second thread constitutes a male thread.

5. A combination according to claim 1, wherein said threaded element and said mating member comprise components of a percussion drill.

6. A combination according to claim 5, wherein said mating member comprises a hollow cylindrical case, said first thread comprising an internal thread in said case, said threaded element comprising a driver sub including internal splines adapted to drive a drill bit, said second thread comprising an external thread on said driver sub.

7. A combination according to claim 1, wherein said first and second crest portions are flat.

8. A combination according to claim 1, wherein said first and second load bearing flanks have a greater surface area than said first and second non-load bearing flanks, respectively.

9. A combination according to claim 1, wherein said first and second load bearing flanks have a smaller surface area than said first and second non-load bearing flanks, respectively.

10. A combination according to claim 1, wherein said first generally elliptical curvature has a inner axis which is shorter than a radial distance between said first crest portion and said first root, said second generally elliptical curvature having a minor axis which is shorter than a radial distance between said second crest portion and said second root.

11. A combination according to claim 1, wherein said first and second screw threads are of substantially equal height.

12. A combination according to claim 1, wherein said first and second screw threads are of a single lead type.

13. A combination according to claim 1, wherein said first and second screw threads are of a multiple lead type.

14. A threaded element adapted to be coaxially threadedly interconnected to a threaded mating member, the member having at least one first screw thread extending helically in spaced thread turns and including a first load bearing flank, a first non-load bearing flank, and a first crest portion extending between the first load bearing flank and the first non-load bearing flank, and a first root extending between adjacent turns of the first thread, the first root defined by a portion of a first generally elliptical curvature having a major axis extending parallel to the axial direction, said threaded element comprising at least one second screw thread extending helically in spaced thread turns, said second thread including a second load bearing flank adapted to engage the first load bearing flank, a second non-load bearing flank, and a second crest portion extending between said second load bearing flank and said second non-load bearing flank, and a second root extending between adjacent turns of said second thread, said second root defined by a portion of a second generally elliptical curvature having a major axis extending parallel to the axial direction, said second thread being of substantially equal height with the first thread and having an axial thickness less than an axial thickness of the first thread, said major axis of said second root being longer than the major axis of the first root.

15. A threaded element according to claim 14, wherein said second generally elliptical curvature is defined by two axially overlapping ellipses.

16. A threaded element according to claim 14, wherein said second generally elliptical curvature is defined by a single ellipse.

17. A threaded element according to claim 16, wherein said second generally elliptical curvature is defined by two axially overlapping ellipses.

18. A threaded element according to claim 16, wherein said threaded element comprises a component of a percussion drill.

19. A threaded mating member having a first screw thread adapted to be coaxially threadedly connected to a second screw thread of a threaded element, the second screw thread extending helically in spaced thread turns and including a second load bearing flank, a second non-load bearing flank, and a second crest portion extending between the second load bearing flank and the second non-load bearing flank, and a second root extending between adjacent turns of the second thread, the second root defined by a portion of a second generally elliptical curvature having a major axis extending parallel to the axial direction, said first thread extending helically in spaced thread turns, said first thread including a first load bearing flank adapted to engage the first load bearing flank, a first non-load bearing flank, and a first crest portion extending between said first load bearing flank and said first non-load bearing flank, and a first root extending between adjacent turns of said first thread, said first root defined by a portion of a first generally elliptical curvature having a major axis extending parallel to the axial direction, said first thread being of substantially equal height with the second thread, said first thread having an axial thickness greater than an axial thickness of the second thread, and said major axis of said first root being shorter than said major axis of the second root.

20. A threaded mating member according to claim 19, wherein said mating member comprises a component of a percussion drill.

* * * * *